(12) United States Patent
Bartels

(10) Patent No.: US 11,017,062 B2
(45) Date of Patent: May 25, 2021

(54) METHOD FOR THE SECURE INTERACTION OF A USER WITH A MOBILE TERMINAL AND A FURTHER ENTITY

(71) Applicant: VOLKSWAGEN AKTIENGESELLSCHAFT, Wolfsburg (DE)

(72) Inventor: Bastian Bartels, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 464 days.

(21) Appl. No.: 16/095,993

(22) PCT Filed: Mar. 30, 2017

(86) PCT No.: PCT/EP2017/057509
§ 371 (c)(1),
(2) Date: Oct. 24, 2018

(87) PCT Pub. No.: WO2017/186445
PCT Pub. Date: Nov. 2, 2017

(65) Prior Publication Data
US 2019/0138701 A1 May 9, 2019

(30) Foreign Application Priority Data

Apr. 29, 2016 (DE) ...................... 10 2016 207 339.7

(51) Int. Cl.
*H04L 29/06* (2006.01)
*G06F 21/30* (2013.01)
(Continued)

(52) U.S. Cl.
CPC ............ *G06F 21/305* (2013.01); *G06F 21/35* (2013.01); *G06F 21/44* (2013.01);
(Continued)

(58) Field of Classification Search
CPC .................. G06F 21/305; G06F 21/44; G06F 2221/2151; H04W 4/80; H04W 4/40; H04L 63/0853
(Continued)

(56) References Cited

U.S. PATENT DOCUMENTS 8,805,434 B2 * 8/2014 Vasudevan ......... G07C 9/00571
455/550.1
9,268,951 B2 2/2016 Oppermann et al.
(Continued)

FOREIGN PATENT DOCUMENTS

CN 102438237 A 5/2012
CN 102959589 A 3/2013
(Continued)

OTHER PUBLICATIONS

Instructables; How to Bypass Windows XP Login Passwords From Scratch; downloaded from https://web-archives.org/web/20170521143452/http://www.instructables.com/id/how-to-bypass-windows-xp-passwords-from-scra/; Jan. 1, 2008.
(Continued)

*Primary Examiner* — Evans Desrosiers
(74) *Attorney, Agent, or Firm* — Barnes & Thornburg LLP

(57) ABSTRACT

A method for the secure interaction of a user with a mobile terminal and a further entity includes transmitting a secret or an image of the secret generated by a one-way function and an individual data from the user to a back-end, transmitting the image and the individual data from the back-end to a protected execution environment of a processor of the mobile terminal; notifying the user on a secure user interface of the mobile terminal, wherein the individual data is displayed to the user and wherein the user is authenticated with the secret, the user interacting with a secure element of
(Continued)

the mobile terminal having a secure connection with the protected execution environment, via the secure user interface and the protected execution environment; and the secure element interacting with the further entity via a secured connection providing a complete security chain of all entities involved in the interaction.

14 Claims, 1 Drawing Sheet

(51) Int. Cl.
    *G06F 21/35* (2013.01)
    *G06F 21/44* (2013.01)
    *H04W 12/041* (2021.01)
    *H04W 12/065* (2021.01)
    *H04W 12/06* (2021.01)
    *H04W 4/80* (2018.01)
    *H04W 4/40* (2018.01)

(52) U.S. Cl.
    CPC .......... *H04L 63/0853* (2013.01); *H04W 4/40* (2018.02); *H04W 4/80* (2018.02); *H04W 12/041* (2021.01); *H04W 12/065* (2021.01); *H04W 12/068* (2021.01); *G06F 2221/2151* (2013.01)

(58) Field of Classification Search
    USPC ............................................................ 726/4
    See application file for complete search history.

(56) References Cited

U.S. PATENT DOCUMENTS

| | | |
|---|---|---|
| 2013/0117857 A1 | 5/2013 | Zimmermann |
| 2013/0190967 A1* | 7/2013 | Hassib ................. G07C 5/0808 |
| | | 701/31.5 |
| 2013/0263215 A1 | 10/2013 | Ekdahl |
| 2014/0270172 A1* | 9/2014 | Peirce ..................... H04L 9/083 |
| | | 380/270 |
| 2014/0317686 A1 | 10/2014 | Vetillard |
| 2015/0137943 A1 | 5/2015 | Nagel et al. |
| 2016/0012653 A1 | 1/2016 | Soroko |
| 2016/0092680 A1 | 3/2016 | Hennig et al. |

FOREIGN PATENT DOCUMENTS

| | | |
|---|---|---|
| DE | 10251890 A1 | 5/2004 |
| DE | 102011118234 A1 | 5/2013 |
| DE | 102012022786 A1 | 5/2014 |
| DE | 102013006070 A1 | 10/2014 |
| EP | 2713328 A1 | 4/2014 |
| EP | 2947598 A1 | 11/2015 |
| GB | 2526540 A | 12/2015 |
| KR | 20130127523 A | 11/2013 |

OTHER PUBLICATIONS

Wikipedia; Communication with submarines; downloaded from https://web-archive.org/web/20170622192210/https://en.wikipedia.org/wiki/Communication_with_submarines; Apr. 14, 2016.
Search Report for International Patent Application No. PCT/EP2017/057509; dated May 22, 2017.
Office Action for Korean Patent Application No. 10-2018-7031981; dated Jun. 19, 2019.
Office Action for Chinese Patent Application No. 201780026554.0; dated Oct. 10, 2020.

* cited by examiner

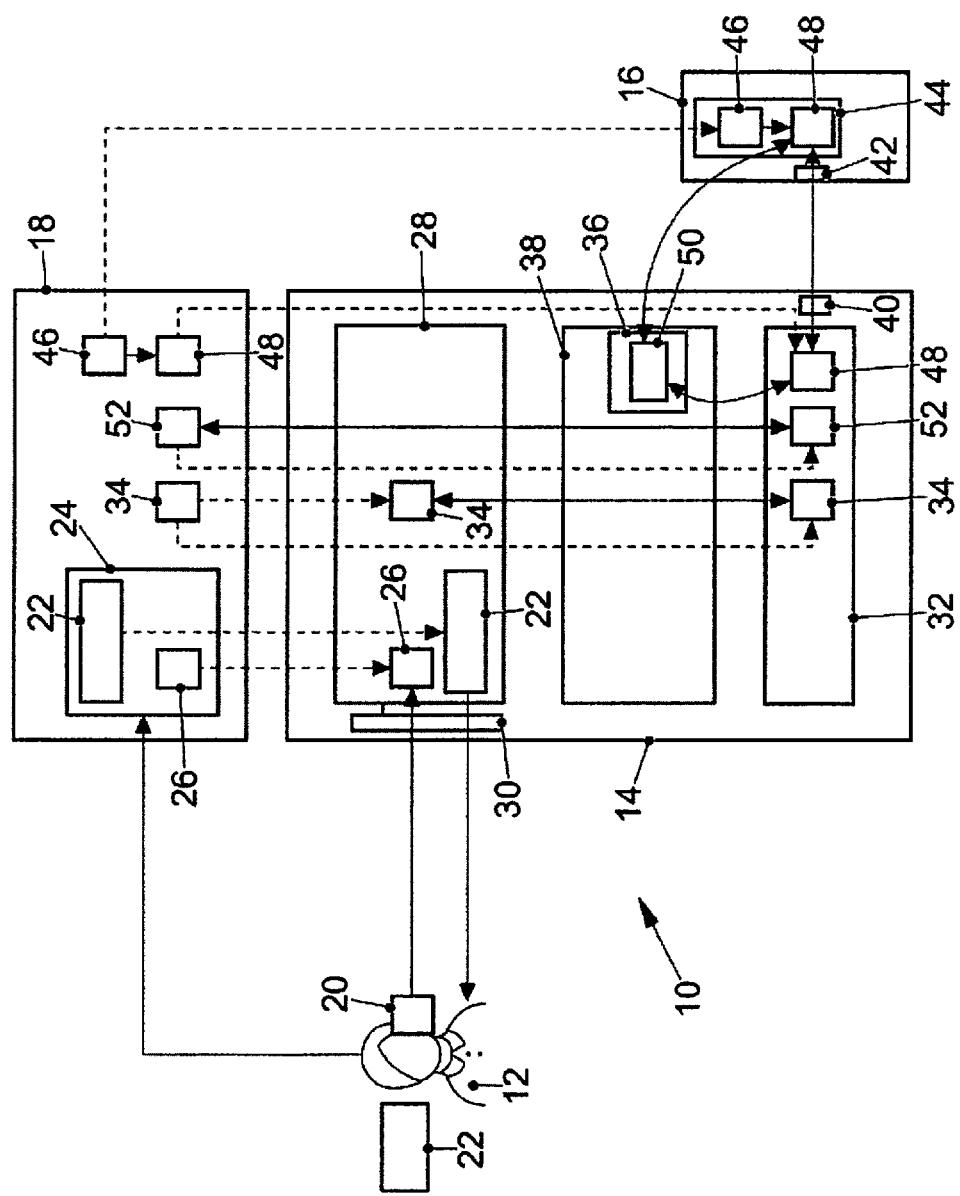

METHOD FOR THE SECURE INTERACTION OF A USER WITH A MOBILE TERMINAL AND A FURTHER ENTITY

PRIORITY CLAIM

This patent application is a U.S. National Phase of International Patent Application No. PCT/EP2017/057509, filed 30 Mar. 2017, which claims priority to German Patent Application No. 10 2016 207 339.7, filed 29 Apr. 2016, the disclosures of which are incorporated herein by reference in their entireties.

SUMMARY

Illustrative embodiments relate to a method and a system for the secure interaction of a user with a mobile terminal and a further entity.

BRIEF DESCRIPTION OF THE DRAWINGS

The disclosed embodiments are explained below with reference to the associated drawings, in which:

FIG. 1 shows a schematic illustration of a system and method for the secure interaction of a user with a mobile terminal and a further entity.

DETAILED DESCRIPTION

When any kind of mobile terminal, such as, for example, a smartphone, is used for secure communication with a transportation vehicle, there are highly critical application areas that require a special security design. If the mobile terminal is, for example, used as a transportation vehicle key, the IT security requirement is very high. In this case, in addition to the mobile terminal, the transportation vehicle as well as a key management system, which is usually arranged in a remote backend, are components of the overall system. Both the individual components and their communication connections must meet appropriate security directives.

Various secure execution environments exist on modern mobile terminals. In addition to software-based solutions, two fundamentally different types of hardware-based secure execution environments exist: secure element (secure element or security module), for example, a SIM card or an embedded secure chip (embedded secure element), and trusted execution environment (protected execution environment), for example, as a secure area of a processor.

EP 2 713 328 A1 discloses a mobile device with a secure processor such as a trusted execution environment or a secure element, designed for secure gesture recognition.

GB 2526540 A discloses a mobile device with a secure element in which cryptographic keys are inserted during production for later use by programs that are to be installed.

US 2014/0317686 A1 discloses a mobile device with a distributed trusted execution environment consisting of two components, namely a trusted execution environment in a secure element and a trusted execution environment proxy which is executed on the mobile device.

Disclosed embodiments provide a complete chain of security of all the entities involved in the interaction in a simple and reliable manner.

This is achieved by the disclosed method or by the disclosed system.

The disclosed method for the secure interaction of a user with a mobile terminal and a further entity comprises the operations of:

transmitting a secret or an image of the secret generated by a one-way function and an individual datum from the user to a backend;

transmitting the image and the individual datum from the backend to a protected execution environment of a processor of the mobile terminal;

registering the user at a secure user interface of the mobile terminal, wherein the individual datum is shown to the user and wherein the user is authenticated with the secret;

interaction of the user with a secure element of the mobile terminal which has a secure connection to the protected execution environment via the secure user interface and the protected execution environment; and interaction of the secure element with the further entity via a secured connection.

The disclosed method allows at least one mobile terminal that is inserted into an integrated security model for communication with a backend and at least one further entity such as, for example, a transportation vehicle. A closed chain of trust of all the entities in distributed systems is created in this way to create a secure overall system. A closed chain of security is ensured through the double-ended authentication between the user and the user interface of the mobile terminal, between the user interface of the mobile terminal and the secure element, between the secure element and the backend, as well as between the secure element and the further entity. Optimum IT security is ensured for this overall system since the whole chain of authentication is carried out in a closed, secure context.

Actions such as, for example, accesses like opening/closing, the actuation of functions such as, for example, starting up, starting navigation and a one-directional or bi-directional communication are here considered to be interactions. The secure element (SE) can comprise an independent computing unit such as, for example, a microcontroller with its own operating system, or it can be a SIM card or of an embedded, secure chip. The protected execution environment (TEE, Trusted Execution Environment) makes a secure or trustworthy run-time environment available for applications. The protected execution environment can be executed or implemented on a separate processor, on the main processor or processors of a computer system, or in one die of a multiprocessor system or of a one-chip-system (SoC). The one-way function generates an image such as, for example, a hash value.

Whereas secure elements have the benefit that they are looked on as tamper-resistant, and thus provide particular precautions against invasive attacks such as ion bombardment or the manipulation of circuit tracks through etching or grinding, protected execution environments have the benefit of theoretically being able to work with the resources of the entire system or SoCs of the mobile terminal. Since protected execution environments are capable of declaring all possible hardware components as secure devices, and are thus able to decide whether data are made available by a peripheral device classified as secure or not secure, the feature of, for example, a "trusted user interface" can be realized. This means that, for example, the input and output facilities of a mobile terminal, such as a touchscreen, can, depending on the context, be declared as a secure device, and all user inputs are no longer seen by the non-secure operating system kernel. This can, for example, be used to secure the customer login at a bank website, in that the password is not entered until the touchscreen has been decoupled from the non-secure kernel and is fully coupled to the secure kernel. The complementary benefits of both technologies are combined here to raise the security level for the interaction between the mobile terminal and the further entity such as, for example, a transportation vehicle. More concretely, it is either possible for individual cryptographic keys to be inserted (either asymmetrically or symmetrically) by the secure element and the protected execution environment through the data loading processes, on the basis of which the secure element can securely communicate bi-directionally with the protected execution environment, or the secure element is natively supported by the protected execution environment.

It can be provided that the secure user interface is declared as a secure device by the protected execution environment. In this way it is possible to use the property of the protected execution environment to declare as secure and link devices or components, which permits great flexibility. The user interface can, for example, be a touchscreen of a mobile telephone. A secure input facility is created. The protected execution environment can, for example, place and/or operate for this purpose in the secure area a virtual machine for the secure user interface, also known as the TUI (trusted user interface). It is thus possible, amongst other things, to ensure that a frame buffer remains only in the secure context, i.e., that it cannot be read out without authorization.

It is further possible to provide that the connection between the protected execution environment and the secure element is protected by a key obtained from the backend. This can be a symmetrical or an asymmetrical encryption. Since the keys originate from the backend, where a secure derivation or generation is guaranteed, a high level of security is provided. In addition, neither the protected execution environment nor the secure element has to comprise the hardware or software required for a derivation or generation of the keys.

It can further be provided that a program for interaction with the further entity is executed in an operating system of the mobile terminal, and that the program interacts with the further entity via the secure element. This program, such as an app, for example, can be used to control functions of the further entity. Since the operating system of the mobile terminal cannot usually be considered secure, it is nevertheless possible, using the proxy function of the secure element, to establish a secure connection between the program and the further entity, for example, to operate functions of the further entity securely.

A secure connection running by the secure element can be established between the backend and the program. Since the operating system of the mobile terminal cannot usually be considered secure, it is nevertheless possible, using the proxy function of the secure element, to establish a secure connection between the program and the backend, for example, to exchange data, to manage authorizations or updates, and to carry out further software installations.

It can be provided that the secure element comprises a communication interface for the program and a communication interface for the further entity, and that the capabilities of at least one communication interface are configured depending on the interaction of the user. It can thus, for example, be provided that following an input or registration of the user, only one or both of the communication interfaces can send or receive data for a particular period of time, for example, for a few minutes. This can increase the security by reducing the possibilities for an attack. The communication interface can be logical, for example, a port or a protocol stack, which is then in connection with a physical interface such as, for example, an NFC controller. The communication interface can, on the other hand, comprise a physical interface such as, for example, an NFC controller.

It can further be provided that, for secure communication between the mobile terminal and the further entity, a key is present in the backend and in the further entity, that a derivation of the key is inserted into the secure element, and that a derivation of the key is performed in the further entity for an authentic connection. Symmetrical or asymmetrical cryptographic methods can be used for this purpose. Symmetrical cryptography has the benefit that only one secret has to be present in the further entity, and that the required derivation in each case is prepared at the time when required. The potentially non-secure mobile terminal only receives a derivation from which the secret cannot be reconstructed.

The disclosed system for the secure interaction of a user with a mobile terminal and a further entity, designed for the execution of a method as described above, comprises a backend in which a secret or an image of the secret and of an individual datum from a user, generated by a one-way function, is stored;

a mobile terminal with a protected execution environment of a processor, designed for storing the image and the individual datum;

a secure user interface of the mobile terminal, designed for the registration and authentic interaction of the user;

a secure element of the mobile terminal which, with the protected execution environment, comprises a secure connection; and a further entity, designed for protected communication with the secure element of the mobile terminal.

The system can comprise one or a plurality of the components described. A plurality of mobile terminals such as, for example, mobile telephones and/or a plurality of further entities, can be provided. The further entities can also be different devices with which secured communication should or must take place. The same benefits and modifications as described before apply.

The mobile terminal and the further entity can comprise a communication interface of a wireless communication standard. This can, for example, be one or a plurality of standards such as NFC (near field communication), BLUETOOTH®, in particular, LE (low energy), WLAN or similar.

The further entity can be a transportation vehicle. The method and system presented here are suitable for transportation vehicles, since in the case of transportation vehicles both a flexible and convenient access as well as high security are significant.

The various disclosed embodiments mentioned in this application can, unless otherwise stated in specific instances, be combined with one another.

FIG. 1 shows a schematic illustration of a system 10 for the secure interaction of a user 12 with a mobile terminal 14, a further entity 16 and a backend 18. The user 12 is the user and/or owner of the mobile terminal 14, such as, for example, a smartphone or tablet, as well as of the further entity 16. The further entity is referred to below as a transportation vehicle 16. The transportation vehicle 16 can, for example, be a passenger car, a commercial transportation vehicle or a motorcycle. Alternatively the further entity can, however, also be any device such as, for example, a cash dispenser or the like. The backend 18 can, for example, be or comprise a central computer or server. The backend 18 belongs to a manufacturer of the transportation vehicle 16 or to a service provider.

The system 10 and a method for the secure interaction running on the system 10 are described below.

The user 12 first selects a secret 20 which can be, for example, a password and/or a biometric feature such as a fingerprint. For this purpose he selects an individual datum 22, such as text, an image or the like. When registering the user 12 at the backend 18 for use of the transportation vehicle 16, both the secret 20 and the individual datum 22 are transmitted to the backend 18, and are stored there in a database 24. Instead of the secret 20, it may be for security reasons that the secret 20 is not stored, but rather an image 26 of the secret 20. The image 26 is generated by a one-way function, which means that it is not possible to calculate back from the image 26 to the secret 20. The image 26 is, for example, a hash value.

A transmission of the image 26 and the individual datum 22 from the backend 19 to a protected execution environment 28 of a processor or of an SoC of the mobile terminal 14 then takes place. This transmission is suggested by dotted arrows, and signifies, as for all the dotted arrows, a secure transmission of the secrets stored in the backend 18 during registration or generated there in corresponding partial systems of the mobile terminal 14 or of the transportation vehicle 16. This data transmission is secured, for example, through secrets inserted during the production process.

The user 12 can now register at a secure user interface 30 of the mobile terminal 14, wherein the individual datum 22 is shown to the user 12 and wherein the user 12 is authenticated with the secret 20. The secure user interface 30 is, for example, a touchscreen that has been or is declared by the protected execution environment 28 as a secure device and treated accordingly.

The protected execution environment 28 can demonstrate to the user 12 by the individual datum 22 that his input facility is trustworthy. The user 12 can demonstrate his identity to the protected execution environment 28 by his secret 20. A derivation or an image is carried out therein from the secret 20, and compared with the image 26. The identity of the user 12 is demonstrated if these are in agreement. A mutual authentication thus takes place.

A secure connection between the user 12 and the protected execution environment 28 via the secure user interface 30 and with the support of the backend 18 is thus established. Neither the user 12 nor the mobile terminal 14 have to remain permanently in connection with the backend 18. A one-off connection, for example, over the Internet or during production, is theoretically sufficient to prepare this secure connection.

After this connection has been established, the actual interaction, such as a communication or the transfer of data or commands, can take place. The user 12 interacts for this purpose with a secure element 32 of the mobile terminal 14 which has a secure connection with the protected execution environment 28. This interaction runs, as previously described, via the secure user interface 30 and the protected execution environment 28. The secure element 32 is a computing unit with, for example, at least a rudimentary Java environment on which different cardlets that represent, for example, controllers or areas of the transportation vehicle 16, run.

The bi-directional connection between the secure element 32 and the protected execution environment 28 is cryptographically secured, for example, by a secret 34 which is either itself inserted, or its derivation, into both the secure user interface 30 as well as into the protected execution environment 28. A symmetrical cryptography, for example, with symmetrical, pre-shared keys, or an asymmetrical cryptography, for example, with private and public keys, is conceivable.

Due to the secure transmission of data between the secure element 32 and the protected execution environment 28 by the secret 34, the benefits of a protected execution environment 28 can be combined with those of a secure element 34. The trustworthy user interface 30 with its protected execution environment 28 with the security against manipulation of the secure element 32. Only when the user's 12 operating wish is established through a mutually authenticated relation between customer and the protected execution environment 28 is this reported to the secure element 32 over the secure path between the protected execution environment 28 and the secure element 32.

The secure element 32 can now, for example, receive, during a specific time window, queries from a program 36 in an operating system 38 which is not itself able to demonstrate its identity to the secure element 32. Expressed otherwise, apps or programs 36 can be permitted authenticated access to the secure element 32 in that an authenticated user input must have previously been made to the protected execution environment 28 which passes this status on securely to the secure element 32.

The secure element 32 is connected with an interface 40, such as, for example, an NFC controller. The transportation vehicle 16 has a corresponding interface 42, so that these two entities can communicate with one another. Transportation vehicle 16 has in addition at least one control device 44 which can be used for control of the interface 42 or of the communication and/or the control of further functions of the transportation vehicle 16.

The way in which the connection between the secure element 32 and the transportation vehicle 16 is secured is described below. A key 46 is established here in the backend 18, as well as a derived key 48 prepared through a derivation process. As shown in FIG. 1 only the derived secret or the derived key 48 is inserted into the secure element 32 of the mobile terminal 14 customers. The original secret, or the key 46, is, however, inserted into the transportation vehicle 16. The idea here is that the transportation vehicle 16 can itself deduce the derived key 48 on an ad hoc basis in the context of the authentication process. The constants used in the backend 18 for deriving the derived key 48 from the key 46 must also be inserted into the secure element 32 for this purpose. With the input of these constants and of the key 46, the key derivation function always unambiguously supplies the derived key 48 as a result. These constants must be sent in clear text from the secure element 32 to the transportation vehicle 16 during every authentication process between the secure element 32 and the transportation vehicle 16. The transportation vehicle 16 can thereupon itself deduce the derived key 48 on an ad hoc basis, since the key 46 is known. After the deduction, the transportation vehicle 16 can verify the authentication evidence from the secure element 32 with the derived key 48, and thus authenticate the secure element 32. The benefit of this idea lies in the fact that the transportation vehicle 16 only has to persistently maintain the key 46. Even if a large number of different mobile terminals should establish secure connections to the transportation vehicle 16, only the key 46 is to be stored in the transportation vehicle 16. As described, each secure element 32 has a different, unique constant such as a byte string which it communicates to the transportation vehicle 16 during the authentication, so that this can thereupon deduce the corresponding derived key 48.

An interaction between the secure element 32 with the further entity or with the transportation vehicle 16 via the above-described secured connection can thus take place. For example, a sequence for opening the transportation vehicle 16 by a challenge-response method can be carried out.

The program 36 can comprise a proxy function 50 which allows the program 36 to communicate securely with the transportation vehicle 16 via the secure element 32. On the one hand, the derived keys 48 are used for this purpose, and on the other hand it can be provided that, as described previously, the program 36 and/or the transportation vehicle 16 may only take part in a communication with the secure element 32 if an appropriate clearance or specification has been given by the user 12 or the protected execution environment 28.

The secured, authentic connection between the program 36 and the backend 18 is provided as a further security element. As shown in FIG. 1, a secret 52 which is generated in the backend 18 and transmitted to the secure element 32 is used for this purpose. The program 36 can encrypt data, and/or have it signed, from the secure element 32 using the secret 52 and then send it to the backend 18, for example, via mobile telephony such as LTE or via WLAN, for example, over the Internet. This connection can also be configured bi-directionally.

Only the secure, bi-directional communication between the secure element 30 and the protected execution environment 28 can, for example, prevent numerous attacks and increase the general security level. Three possible attacks and their defense through the described system and method are explained below by way of example for a particularly security-critical function such as, for example, the use of the mobile terminal 14 as a digital transportation vehicle key via, for example, BTLE (BLUETOOTH® low energy).

In a first case, an attacker has installed malware on the mobile terminal 14 of the user 12. The attacker now places himself within BTLE range of the transportation vehicle 16 of the user, and arranges for the malware to execute the unlock command on the mobile terminal 14. The attacker now has the malware email the radio command for unlocking the doors. The attacker can then transmit the unlock command via BTLE from his smartphone to the transportation vehicle 16 and thus assert his smartphone as the correct key.

The secure transmission chain proposed here can prevent the above scenario. An app interface with unlock buttons is located in the secure area, i.e., in the secure element 32 and/or the protected execution environment 28. It is only possible to operate the secure area via the secure user interface 30. A signal or bit is only set when the operation is carried out via the secure user interface 30 when this is connected to the secure area. This bit is sent in an authenticated manner from the protected execution environment 28 to the secure element 32. The secure element 32 now only calculates a response to the challenge from the transportation vehicle 16 if in the recent past it has received a bit transmitted in an authenticated manner from the protected execution environment 28.

In a second case, the user 12 uses an app to register with a service for managing keys. An attacker has installed malware on the mobile terminal 14, and records the access data of the user 12, such as, for example, the email address, the password and a super PIN. The attacker then logs in to the service in the name of the user 12, and sends transportation vehicle keys to his own smartphone. The attacker then steals the transportation vehicle 16 of the user 12.

The secure transmission chain proposed here can also prevent this scenario. The user 12 must be verified once with the service supplier when registering for the service. In this context, the user 12 selects an individual datum 22, for example, a picture he has drawn himself. This is transmitted by the handler through a dedicated backend connection into the backend system 18, and saved for the user 12. When the mobile terminal 14 is provisioned, this graphic is transferred into the protected execution environment 28 of the mobile terminal 14. When the user 12 logs into the app of the service, the login screen is displayed via the secure user interface 30. The user's individual graphic is displayed so that the user 12 knows this. The user 12 can now enter an email address and password, but no malware is able to record this data, since it is entered through the secure user interface 30 which has a separate, secure storage area in the protected execution environment 28.

In a third case, an attacker has installed malware on the mobile terminal 14. The attacker uses the secure element 32 as an oracle to collect as many challenge/response pairs as possible. When the attacker has collected enough pairs, he goes to the transportation vehicle 16 and unlocks it.

The secure transmission chain proposed here can also prevent this scenario. A property of the wireless transmission between the mobile terminal 14 and the transportation vehicle 16 can, for example, be used here. An NFC system, for example, has the benefit that a cardlet of an at least rudimentary Java environment can distinguish whether a query originates from the host OS or from an antenna. To achieve an equivalent security level with BTLE, the protected execution environment 28 and the secure element 32 must be able to exchange data in an authenticated and trustworthy manner, which is possible here. Therefore only access to the secure element 32 by the protected execution environment 28 is allowed. Furthermore, the protected execution environment 28 must have authenticated itself to the secure element 32 (and vice versa). If this is now used with the secure user interface 30, i.e., the switching of the touchscreen to the secure world, a trigger can only occur after interaction with the app itself has taken place. Any trigger from software, i.e., malware in the host OS, can be declined by the secure element 32, since it is not occurring through the protected execution environment 28.

As indicated previously, the disclosed embodiments add mobile terminals to an integrated security model for communication with a backend and transportation vehicles, so that a secure transmission chain that improves security results.

LIST OF REFERENCE SIGNS

10 System
12 User
14 Mobile terminal
16 Further entity
18 Backend
20 Secret
22 Individual data
24 Database
26 Image
28 Protected execution environment
30 Secure user interface
32 Secure element
34 Secret
36 Program
38 Operating system
40 Interface
42 Interface
44 Control device
46 Key
48 Derived key 50 Proxy
52 Secret

The invention claimed is:

1. A method for secure interaction of a user's mobile terminal and a further entity, the method comprising: transmitting a secret or an image of the secret generated by a one-way function and an individual datum from the user's mobile terminal to a backend; transmitting the image and the individual datum from the backend to a protected execution environment of a processor of the user's mobile terminal; registering the user at a secure user interface of the user's mobile terminal, wherein the individual datum is shown to the user via the user's mobile terminal and wherein the user is authenticated with the secret; interaction of the user with a secure element of the user's mobile terminal which has a secure connection to the protected execution environment via the secure user interface of the user's mobile terminal and the protected execution environment; and enabling interaction of the secure element with the further entity via a secured connection; wherein the secure interaction between the mobile terminal and the further entity comprising a key present in this backend and in the further entity, a derivation of the key is inserted into the secure element, and the derivation of the key is performed in the further entity for an authentic connection.

2. The method of claim 1, wherein the secure user interface is declared as a secure device by the protected execution environment.

3. The method of claim 1, wherein the connection between the protected execution environment and the secure element is protected by a key obtained from the backend.

4. The method of claim 1, wherein a program for interaction with the further entity is executed in an operating system of the user's mobile terminal, and the program interacts with the further entity via the secure element.

5. The method of claim 4, wherein a secure connection running by the secure element is established between the backend and the program.

6. The method of claim 4, wherein the secure element comprises a communication interface for the program and a communication interface for the further entity, and the capabilities of at least one communication interface are configured based on the interaction of the user.

7. A system for the secure interaction of a user with a mobile terminal and a further entity for the execution of a method as for the secure interaction of a user with a mobile terminal and a further entity which transmits a secret or an image of the secret generated by a one-way function and an individual datum from the user to a backend, transmits the image and the individual datum from the backend to a protected execution environment of a processor of the mobile terminal, registers the user at a secure user interface of the mobile terminal wherein the individual datum k shown to the user and wherein the user is authenticated with the secret, allows interaction of the user with a secure element of the mobile terminal which has a secure connection to the protected execution environment via the secure user interface and the protected execution environment, and allows interaction of the secure element with the further entity via a secured connection, the system comprising: a backend in which a secret or an image of the secret and of an individual datum from a user is generated by a one-way function and stored; a mobile terminal with a protected execution environment of a processor for storing the image and the individual datum; a secure user interface of the mobile terminal, for the registration and authentic interaction of the user; a secure element of the mobile terminal which, with the protected execution environment, comprises a secure connection; and the further entity, for protected communication with the secure element of the mobile terminal; wherein the secure interaction between the further entity, a derivation of the key is inserted into the secure element, and the derivation of the key is performed in the further entity for an authentic connection.

8. The system of claim 7, wherein the mobile terminal and the further entity comprise a communication interface of a wireless communication standard.

9. The system of claim 7, wherein the further entity is a transportation vehicle.

10. The system of claim 7, wherein the secure user interface is declared as a secure device by the protected execution environment.

11. The system of claim 7, wherein the connection between the protected execution environment and the secure element is protected by a key obtained from the backend.

12. The system of claim 7, wherein a program for interaction with the further entity is executed in an operating system of the mobile terminal, and the program interacts with the further entity via the secure element.

13. The system of claim 11, wherein a secure connection running by the secure element is established between the backend and the program.

14. The system of claim 13, wherein the secure element comprises a communication interface for the program and a communication interface for the further entity, and the capabilities of at least one communication interface are configured based on the interaction of the user.

* * * * *